United States Patent [19]

Whitfill et al.

[11] Patent Number: 4,819,723
[45] Date of Patent: Apr. 11, 1989

[54] REDUCING THE PERMEABILITY OF A ROCK FORMATION

[75] Inventors: Donald L. Whitfill; Nick O. Wolf; Jerry D. Purkaple, all of Ponca City, Okla.

[73] Assignee: Conoco Inc., Ponca City, Okla.

[21] Appl. No.: 36,933

[22] Filed: Apr. 6, 1987

[51] Int. Cl.⁴ .................. E21B 33/138; E21B 36/04
[52] U.S. Cl. ........................... 166/248; 166/60; 166/65.1; 166/288; 166/292; 166/293
[58] Field of Search ............... 166/60, 65.1, 248, 288, 166/292, 293, 294

[56] References Cited

U.S. PATENT DOCUMENTS

| | | | |
|---|---|---|---|
| 3,145,774 | 8/1964 | Patchen | 166/293 |
| 3,189,088 | 6/1965 | Cronberger | 166/60 X |
| 3,205,946 | 9/1965 | Prats et al. | 166/288 |
| 3,435,899 | 4/1969 | McLaughlin et al. | 166/292 |
| 3,592,267 | 7/1971 | Stainback et al. | 166/294 |
| 4,193,448 | 3/1980 | Jeambey | 166/60 |
| 4,293,440 | 10/1981 | Elphingstone et al. | 166/288 X |
| 4,547,298 | 10/1985 | Novak | 166/294 X |
| 4,638,863 | 1/1987 | Wilson | 166/60 X |

FOREIGN PATENT DOCUMENTS 2427031 12/1975 Fed. Rep. of Germany ...... 166/248

Primary Examiner—George A. Suchfield

[57] ABSTRACT

Permeability of a highly permeable zone in a subterranean formation is reduced by injecting an oil external emulsion of an aqueous solution of alkali metal silicate. Emulsion adjacent the well bore is broken by the application of microwave. Released alkali metal silicate then forms a plug of gel at this point, through contact with formation brines, which holds the rest of the emulsion in place until it breaks down and gels. In one aspect a second internal phase containing a gelation agent is provided to accelerate gelling.

8 Claims, 2 Drawing Sheets

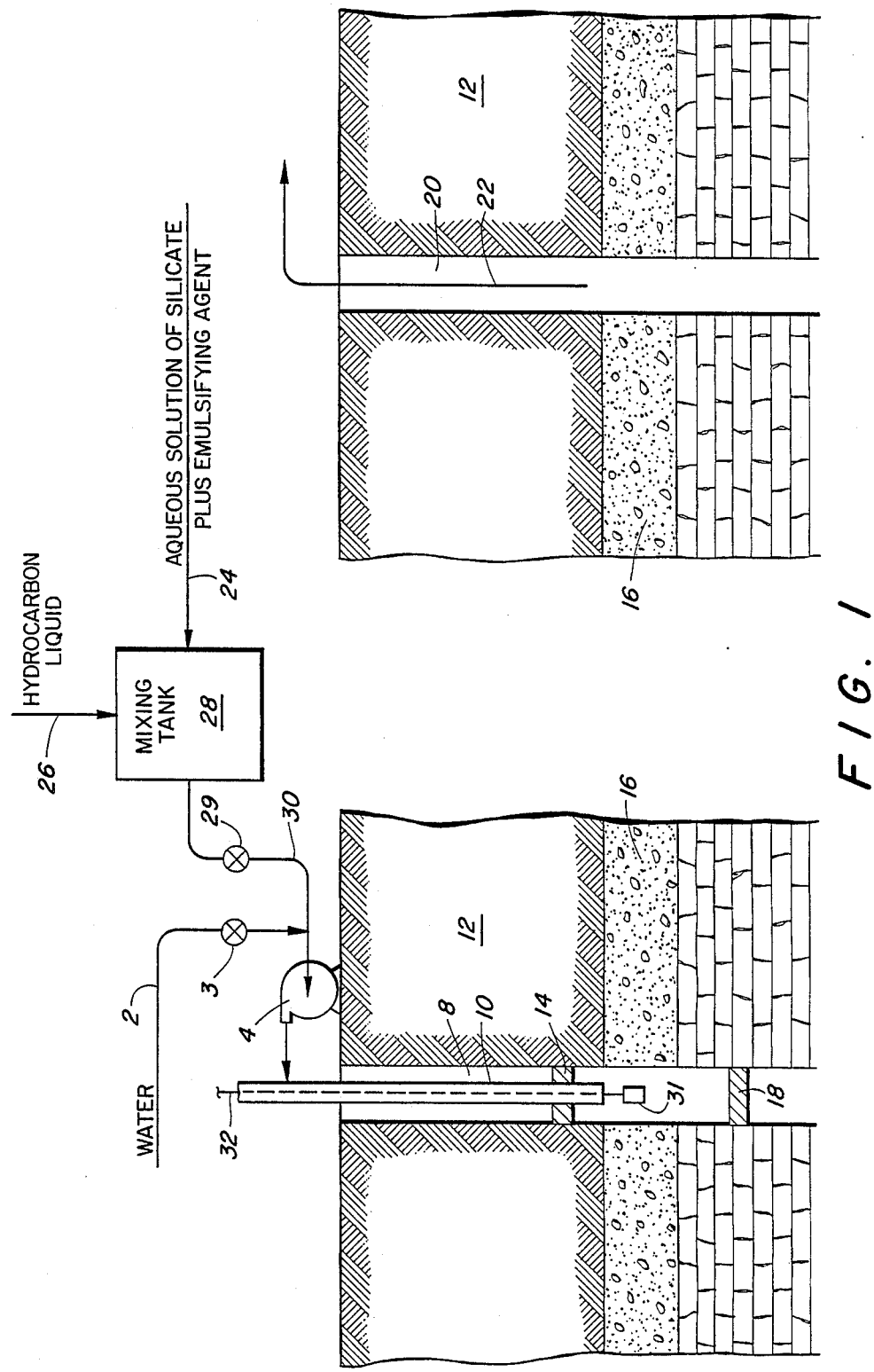

REDUCING THE PERMEABILITY OF A ROCK FORMATION

BACKGROUND AND SUMMARY OF THE INVENTION

The problem of fluid loss to highly porous underground formations penetrated by a well has been long recognized. These highly porous zones are often called thief zones. In water or steam stimulation operations, for example, a serious problem is often encountered because a very small interval of the total production zone may be taking 80 percent or more of the total injected fluid. When this happens, the benefit of the injection project may be lost or greatly reduced.

An isolated high-permeability zone or fracture can be plugged at the well bore face by a shallow layer of applied cement, though such a permanent relatively irrevocable technique often is undesirable. More desirably, a communicating high-permeability zone is plugged to some considerable depth in order to prevent flood water from otherwise merely flowing around a narrow shallow plug and back into the high-permeability or swept zone. In-depth plugging of a relatively high-permeability zone converts the zone into a much lower permeability zone. Then, subsequently injected flood water or other fluid will tend to enter the formerly by-passed but now relatively more permeable hydrocarbon-bearing zones and thus mobilize increased amounts of hydrocarbons.

Various methods have been used in the past to achieve in-depth gelling, such as gelable systems triggered by a following aqueous acidic solution injection for subsequent pH adjustment. However, injecting an acidic solution following the gelable solution may result in such rapid gelation that sufficient in-depth plugging is not obtained in the most permeable strata where desired. In another method, water, a polymer and a cross-linking agent capable of gelling the polymer such as a sequestered polyvalent metal cation, are admixed, and, just before injection into an underground formation, an acid is added thereto to effect gelation. But, when the acid is pre-mixed with the gelable composition, the gelation can be too fast, making it necessary to shear the gelled polymer in order to obtain adequate injection, which reduces effectiveness of the gel.

Other methods have used various compounds and procedures to control gelling of alkali metal silicates in underground formations. These methods often have problems with premature gelling so that deep penetration in the formation is not achieved.

According to this invention substantial reduction in permeability of a highly permeable zone in an underground formation is achieved by introducing into the formation through a well bore an emulsion of an aqueous solution of an alkali metal silicate in a liquid hydrocarbon, thereafter subjecting the solution adjacent the well bore to microwave energy to break the emulsion, releasing alkali metal silicate to form a gel through contact with formation brines and thereby sealing off the remainder of the formation from the well bore. Over a period of time the emulsion in the remainder of the formation will break and release alkali metal silicate to gel and plug the remainder of the formation. Where salinity of the formation brine is insufficient to gel the alkali metal silicate in a reasonable period of time, a gelation agent is incorporated in the hydrocarbon liquid as a second internal phase to accelerate gelling.

PRIOR ART

U.S. Pat. No. 3,592,267 discloses a method of consolidating an unconsolidated sand by contacting the sand with a water-in-oil emulsion containing sodium silicate in the aqueous phase, flushing with hydrocarbon, and then contacting the sand with a polyvalent ion solution to gel the silicate which coats the sand grains.

U.S. Pat. No. 3,435,899 discloses plugging or sealing subterranean formations with sodium silicate solutions having a controlled gel time. The silicate is gelled by slow release of multivalent ions from complexes of the ions which are contacted with the aqueous sodium silicate solutions.

U.S. Pat. No. 4,193,448 and Offenlegungsschrift No. 24,27,031 disclose treating oil bearing formations with microwaves.

BRIEF DESCRIPTION OF THE DRAWINGS

FIG. 1 is a schematic diagram, partially in cross-section of an apparatus arrangement illustrating the invention.

DETAILED DESCRIPTION OF THE INVENTION

Figure 3:
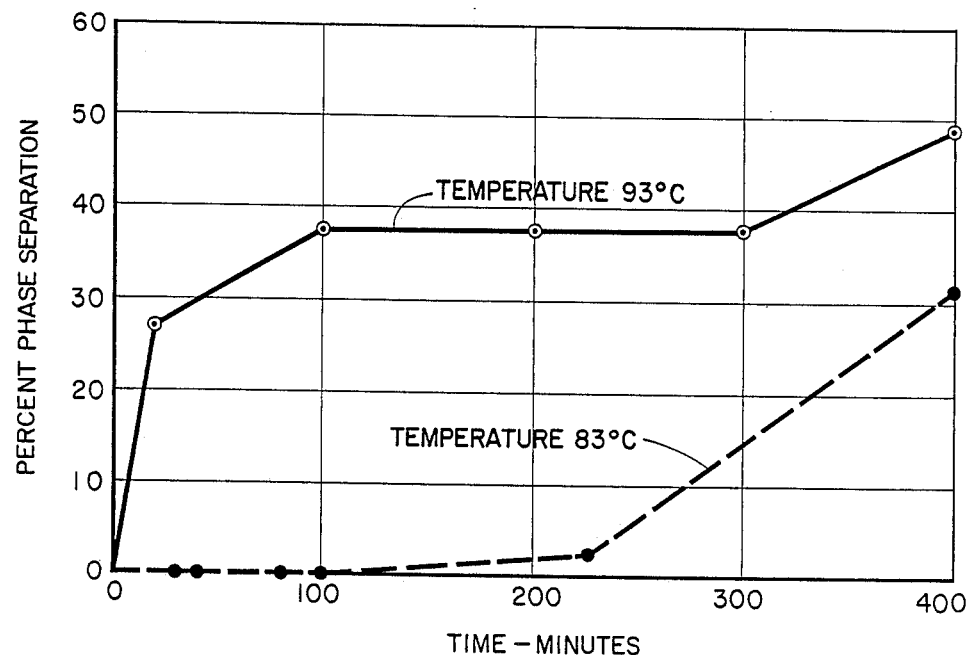
FIG. 3 illustrates the separation rate of a moderate viscosity emulsion of sodium silicate in diesel fuel at two different temperature levels.

Referring now to FIG. 1 there is provided a well 8 which penetrates an earth formation 12. This well also penetrates a streak or zone 16 of high permeability. Tubing string 10 provides fluid communication from the surface through the wellhead to the porous formation 16. Suitable surface tubing 6 connects tubing string 10 with the discharge of pump 4. In a waterflood operation water is introduced into the injection well through line 2, valve 3, pump 4 and line 6. Block valve 29 is closed during this operation. Some distance from the injection well there is provided a production well 20 which also traverses earth formation 12 and permeability zone 16. After the waterflood has been in operation for some time, it is found that water entering the injection well passes primarily through permeable zone 16 and into the production well, from which it passes to the surface through tubing string 22. As a result, little or no oil is produced from other zones in contact with the production well. In order to remedy this problem, it is necessary to reduce the permeability of zone 16 so that water introduced in the injection well will preferentially flow through other oil bearing zones and thus force the oil into the production well. As a first step an aqueous solution of an alkali metal silicate is mixed with a surfactant emulsifying agent and introduced through line 24 into mixing tank 28. At the same time a hydrocarbon liquid is also introduced into the mixing tank via line 26. In tank 28 the hydrocarbon liquid, aqueous solution of sodium silicate and emulsifying agent are thoroughly mixed to provide an emulsion of the silicate in the hydrocarbon liquid. Thus the hydrocarbon liquid is the external or continuous phase of the emulsion.

Any alkali metal silicate may be used in carrying out the process of the invention. Sodium silicate, because it is readily available, is preferred. Sodium silicate is a complicated system of various molecular weight silica polymers in an alkaline solution. Aside from requiring a certain minimum amount of alkalinity, sodium silicate has no definite chemical combining numbers.

The emulsifying agents employed in preparing the emulsions are surfactant compounds which have long hydrocarbon chains which are soluble in oil and polar groups such as carboxylates, sulfonates, ether, or alcohol which are soluble in water. Usually two types of surfactants are used, a primary surfactant which does most of the work in forming the emulsion, and a secondary surfactant which usually has greater stability and/or enhances solubility of the emulsion. Usually the secondary surfactant is not as strong a surfactant as the primary surfactant. Examples of primary surfactants are oil soluble alkylbenzene sulfonates in which the alkyl group contains about 8 to about 40 carbon atoms and alpha olefin sulfonates in which the olefin contains about 12 to about 30 carbon atoms. Typical secondary surfactants are $C_{10}$ to $C_{12}$ alcohol ethoxylates, isobutyl alcohol, lauryl sulfate, $C_{16}$ alpha olefin sulfonate and the like. While a secondary surfactant is helpful, it is not essential in forming the emulsion.

The hydrocarbon liquid used in preparing the emulsion may be any light hydrocarbon such as diesel oil or kerosene, or a low viscosity crude may used. Usually diesel fuel is preferred because of its cost and ready availability.

The emulsion leaves tank 28 through valve 29 and line 30 and is pumped through pump 4 and line 6 into tubing string 10. Block valve 3 is closed during this operation. For best results permeable zone 16 is isolated from nearby zones by using a bridge plug 18 and setting a treatment packer 14. Upon leaving tubing string 10 the emulsion enters into permeable zone 16 flowing toward the production well 20. Once the desired treatment volume has been injected, the emulsion remaining in tubing string 10 is displaced into the formation with fresh water. Next a microwave generator 31 is lowered via cable 32 through tubing string 10 until it is adjacent permeable zone 16. Any conventional microwave generator may be used for this purpose. Typical apparatus is shown in U.S. Pat. No. 4,193,448 and West German Offenlegungsschrift No. 2427031. Microwave energy is then introduced into permeable zone 16 to cause the emulsion to break and release sodium silicate. Usually microwave energy sufficient to raise the emulsion to a temperature of 150° to 250° F. is adequate for this purpose. The released sodium silicate upon contact with brine in permeable zone 16 forms a plug of gel adjacent well 8 thus blocking the remainder of this zone from well 8.

That portion of the emulsion in permeable zone 16 which is not adjacent well 8 eventually breaks. At such time as this occurs, sodium silicate is released from this portion of the emulsion and through contact with formation brine is converted to a gel which substantially reduces the permeability of zone 16. Because of the plug of gel which blocks zone 16 from well 8, it is not necessary to wait for all of the emulsion within the formation to break and form a gel. This well can be placed back in service along with production well 20 without waiting for gelation to take place in deeper portions of zone 16. When water injection is resumed water is forced into other zones (not shown) which contain oil, thereby increasing the production of oil from the formation.

In some cases the salinity of the formation brine is not sufficient to cause gelation of the alkali metal silicate in a reasonable period of time after the emulsion breaks. Additional salinity can be provided by introducing divalent cations, for example, in the form of calcium chloride, into the formation. This is carried out in the method of the invention by emulsifying the calcium chloride as a second internal phase in the liquid hydrocarbon. Other polyvalent cations which may be used include iron, chromium, copper and the like.

The volume of the emulsion injected in the zone of high permeability to be treated is determined by the size of the zone. Typically volumes from about 5 to about 100 percent of the pore volume of the zone to be treated are used. Once the amount of emulsion has been determined and the injection rate in the zone to be treated has been set, the treatment time can then be estimated. An emulsion is then prepared which is stable for the amount of time equal to the required treatment time. The amount of each component in the emulsion may vary widely depending on the specific materials used and the time stability desired. Generally the emulsion will contain a major proportion of hydrocarbon liquid, between about 50 and about 85 percent by weight. The primary and secondary emulsifying agents will be present in an amount between about 5 percent and about 35 percent by weight and between about 2 percent and about 10 percent by weight respectively. The sodium silicate component usually varies between about 5 and about 40 percent by weight.

In FIG. 1 the emulsion is prepared by combining the emulsifying agent and aqueous solution of silicate and admixing this mixture with the hydrocarbon liquid. If desired, the emulsifying agent may instead be added to the hydrocarbon liquid and the aqueous solution of silicate introduced slowly with mixing to form the emulsion.

In some instances it is not possible to isolate the zone of high permeability. In this situation emulsion introduced into the well will enter other portions of the formation besides the particular formation to be treated. This problem may be solved by transmitting microwave energy only to that portion of the zone which it is desired to treat thereby causing the emulsion to break and gelation to occur only in that zone. Other zones which have received emulsion upon injection but were not exposed to microwaves can then be produced to recover the emulsion and prevent gelation in those zones.

The following examples illustrate the results obtained in carrying out the invention.

EXAMPLE 1

Emulsions in diesel oil were prepared by mixing sodium silicate with $C_{25}$ alkyl benzene sulfonate, adding diesel oil with additional mixing and then adding isobutyl alcohol with still further mixing. The emulsions contained different proportions of components ranging from 5 to 35 percent alkyl benzene sulfonate, 10 to 40 percent sodium silicate, 55 to 85 percent diesel oil, and 4.2 percent isobutyl alcohol. The samples were placed on a shelf and watched for separation over a time period of approximately one week. The results of the test are shown in the phase diagram of FIG. 2. Starting at the right of the diagram in the first area shown labeled 1 φ (1 phase) there is no separation of emulsion. In the next area labeled 2 φ the emulsion has separated into two phases and in the third section labeled 3 φ the emulsion has separated into three phases.

It is noted from the diagram that for emulsion containing less than 34 percent silicate, more than 16 percent surfactant and 50 to 100 percent diesel oil there is no phase separation in the time period covered.

EXAMPLE 2

Using the same components as in Example 1, an emulsion was prepared of 59 grams of sodium silicate, 22½ grams of alkylbenzene sulfonate, 112 grams of diesel oil and 6.8 grams of isobutyl alcohol. One sample of the emulsion was placed in a hot water bath at a constant temperature of 83° C. and a second sample was placed in a steam bath at a constant temperature of 99° C. Each of these samples was observed over a period of time to ascertain phase separation. The results are presented in FIG. 3. At the lower temperature it is noted that there was no phase separation for the first 100 minutes and only 2 to 3 percent separation after approximately 223 minutes. On the other hand, with increased temperature, phase separation occurred early and reached approximately 37 percent after 100 minutes. Two other samples of the same emulsion subjected to room temperature and 55° C. respectively showed no phase separation during the 400 minutes.

EXAMPLE 3

Figure 2:
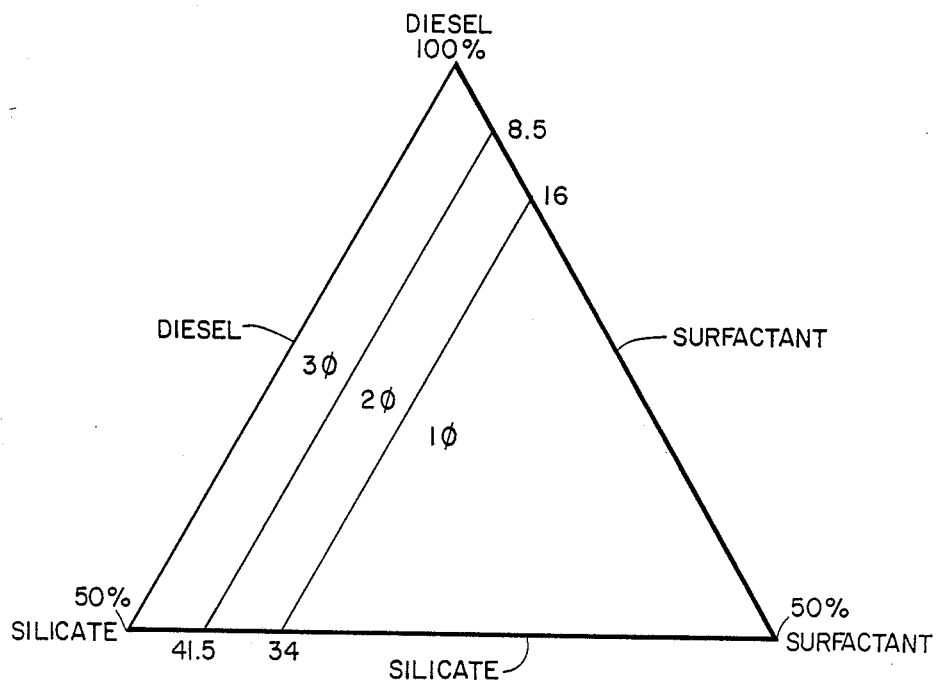
FIG. 2 is a phase diagram of a water-in-oil emulsion of sodium silicate in diesel fuel.

Samples of the emulsions used in the preparation of the phase diagram of FIG. 2 were subjected to microwaves in a microwave oven. The composition of the samples and the results obtained are set forth in the following table:

TABLE

| Sample Composition/ gm | Microwave Time/ sec | Final Temperature °F. | Results |
|---|---|---|---|
| 1 Diesel - 55 Silicate - 25 Surfactant - 20 | 15.3 | 180 | Phases started to separate immediately & continued separation with time. |
| 2 Diesel - 62.5 Silicate - 17.5 Surfactant - 20.0 | 15.3 | 194 | Initial oil break out good but lower phase still emulsified. |
| 3 Diesel - 59.0 Silicate - 13.5 Surfactant - 27.5 | 12 | 160 | Sample spilled. |
| 4 Diesel - 73.5 Silicate - 14.0 Surfactant - 12.5 | 15.3 | 180 | Good oil break - some initial separation. |
| 5 Diesel - 58.5 Silicate - 29.0 Surfactant - 12.5 | 15.5 | 180 | Very good initial oil and water separation. |
| 6 Diesel - 70 Silicate - 10 Surfactant - 20 | 15.3 | 190 | Same as Sample 1. |

It is apparent that the emulsions employed in carrying out the invention are effectively broken by subjecting them to microwaves to release the alkali metal silicate.

EXAMPLE 4

In a waterflood of an oil-bearing formation salt water is injected for six months. The well is completed open hole. At the end of this time the well is logged and it is found that 70 percent of the injection water is being lost into a thief zone.

2000 barrels of an emulsion of 20 wt% sodium silicate in lease crude is prepared using $C_{16}$ α-olefin sulfonate (20 wt%) and lauryl sulfate (5 wt%) surfactants. The emulsion is introduced into the injection well over a period of 48 hours. Subsequently a microwave generator containing a high voltage magnetron is lowered into the well bore of the injection well and microwave energy is transmitted into the formation. The sodium silicate emulsion adjacent to the well bore is quickly broken, releasing sodium silicate which forms a gel through contact with formation brine, thereby sealing off the remainder of the formation containing unbroken emulsion. Over a period of time the remaining emulsion eventually breaks and gelation of the sodium silicate plugs the entire thief zone. However, because the plug at the well bore prevents the emulsion from producing back out of the formation water injection may be recommenced 36 hours after the plug is formed. Upon logging the injection well a second time it is determined that the thief zone is now taking only 10 percent of the injection water. Thus the permeability of the thief zone is substantially reduced by the method of the invention.

We claim:

1. A method for reducing permeability in a highly permeable subsurface zone surrounding a well bore which comprises (1) injecting down the well bore and into the zone an emulsion of an aqueous solution of an alkali metal silicate liquid in a hydrocarbon, (2) thereafter transmitting microwave energy into the zone adjacent the well bore to break the emulsion, release alkali metal silicate to form a plug of gel through contact with formation brines adjacent the well bore and thereby seal off the remainder of the zone from the well bore and (3) thereafter allowing the emulsion in the remainder of the zone to break and release alkali metal silicate to gel and plug the remainder of the zone over a period of time.

2. The process of claim 1 in which plugging of the remainder of the zone is accelerated by additionally dispersing a gelation agent in the liquid hydrocarbon in a second internal phase.

3. The process of claim 1 in which the liquid hydrocarbon is diesel fuel and the alkali metal silicate is sodium silicate.

4. The process of claim 2 in which the liquid hydrocarbon is diesel fuel and the alkali metal silicate is sodium silicate.

5. A method for reducing permeability of a subsurface formation surrounding a well bore where it is not possible to isolate the zone which is to be reduced in permeability which comprises (1) injecting down the well bore and into the formation an emulsion of an aqueous solution of an alkali metal silicate in a liquid hydrocarbon, (2) thereafter transmitting microwave energy into the formation adjacent the well bore, only in the zone where reduction in permeability is desired, to break the emulsion, release the alkali metal silicate to form a plug of gel through contact with formation brines adjacent the well bore and thereby seal off the remainder of the zone from the well bore, (3) allowing the alkali metal silicate dispersion in other portions of the formation to be produced and thereby prevent gelation in such portions, and (4) thereafter allowing the emulsion in the remainder of the zone to break and release alkali metal silicate to gel and plug the remainder of said zone over a period of time.

6. The process of claim 5 in which gelation in the remainder of the zone is accelerated by additionally dispersing a gelation agent in the liquid hydrocarbon in a second internal phase.

7. The process of claim 5 in which the liquid hydrocarbon is diesel fuel and the alkali metal silicate is sodium silicate.

8. The process of claim 6 in which the liquid hydrocarbon is diesel fuel and the alkali metal silicate is sodium silicate.

* * * * *